Figure 3:
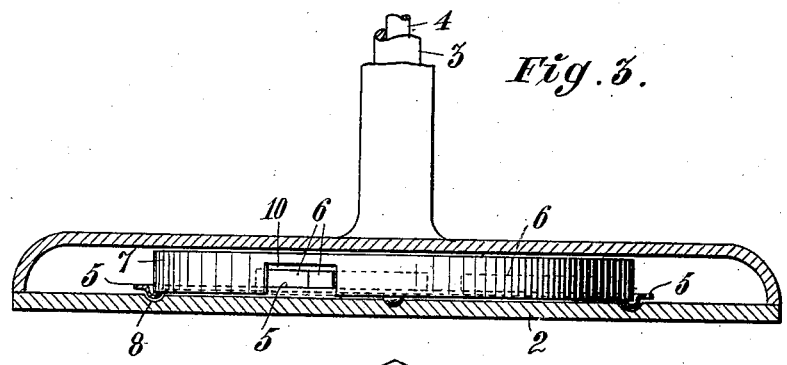

E. G. RÅDBERG.
GRAIN DRILL.
APPLICATION FILED JAN. 28, 1909.
969,406.
Patented Sept. 6, 1910.
2 SHEETS—SHEET 1.
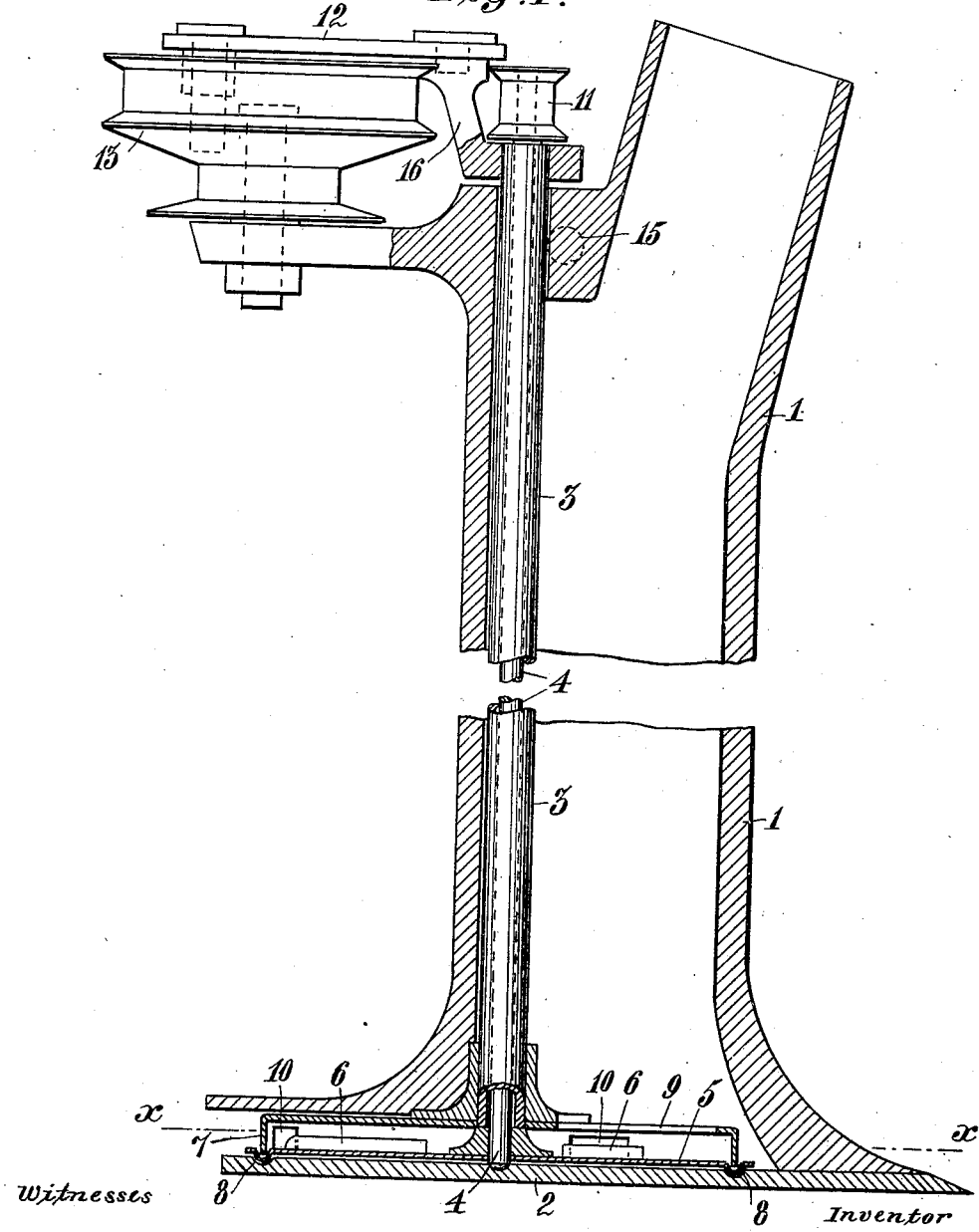

E. G. RÅDBERG.
GRAIN DRILL.
APPLICATION FILED JAN. 28, 1909.

969,406.

Patented Sept. 6, 1910.
2 SHEETS—SHEET 2.

Witnesses

Inventor

UNITED STATES PATENT OFFICE.

ERIK GUSTAF RÅDBERG, OF KRISTINEHAMN, SWEDEN.

GRAIN-DRILL.

969,406.  Specification of Letters Patent.  Patented Sept. 6, 1910.

Application filed January 28, 1909. Serial No. 474,746.

*To all whom it may concern:*

Be it known that I, ERIK GUSTAF RÅDBERG, a subject of the King of Sweden, residing at Kristinehamn, in the Kingdom of Sweden, have invented new and useful Improvements in Grain-Drills, of which the following is a specification, reference being had to the drawings accompanying and forming a part hereof.

This invention relates to grain-drills or the like.

In sowing-machines in which the grain-spout forms a tube through which the grains fall down and spread laterally, in order to escape through an opening at the rear side of the spout, it is of importance, for obtaining the desired action, to provide for a uniform spreading of the grains. This is, however, for several reasons, difficult to accomplish. Thus, for instance, the slope of the machine or of the spout or spouts, or rapid movements thereof toward one or the other side may cause the seed to accumulate at one side or one end of the escape-opening.

The object of the invention is to remove the said drawback and provide a reliable spreading which is under all circumstances quite uniform.

Further objects of the invention will hereinafter appear.

The invention consists, chiefly, in the provision of a spreading device, suitably situated at the foot of the spout, a rotary disk having vanes or the like adapted to throw the grains toward the periphery of the disk, being preferred. Owing to the fact that the ejection of the grains from the delivery-tube or spout is to take place in a backward direction, a suitable guiding device should be provided, said guiding device, consisting of a cap or the like placed immediately above the rotary disk. When the machine is working, the grains are thrown against the inner side of the said cap and guided thereby toward one or more outlet openings in the wall of the cap. In order that the grains may be spread uniformly to a certain width, said cap should oscillate, during sowing, over the rearwardly directed outlet opening of the discharge-tube or spout.

The invention further comprises the construction and combination of parts hereinafter more particularly described.

In the drawings, I have shown, by way of example, a grain-drill embodying the invention.

Figure 2:
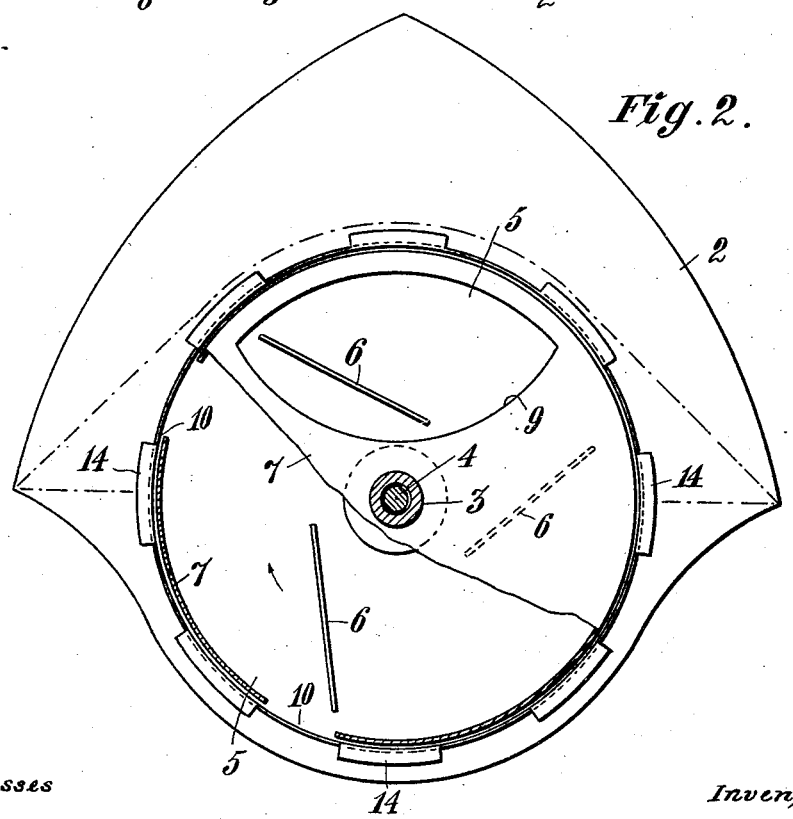

Figure 1 is a vertical longitudinal section of the discharge-tube or spout. Fig. 2 is a horizontal section on line *x—x* of Fig. 1, and Fig. 3 is a rear view of the spout, partly in section.

Referring to the drawings, 1 is the discharge-tube or spout having a sole or bottom-plate 2. Journaled in the spout is a sleeve 3, and journaled in the said sleeve 3 is an axle or shaft 4 having attached to its lower end a disk 5 provided with vanes 6 (Fig. 2). Attached to the lower end of the sleeve 3 is a cap 7 entering with its lower edge into an annular groove 8 in the disk 5. By this means sufficient tightening is obtained between the disk 5 and the cap 7 so that the seed is prevented from clogging between the said parts. The cap is provided at its top with an opening 9 allowing the grains to enter into the cap and fall on the disk 5. Provided in the wall of the cap are two openings 10 through which the seed is ejected by the vanes 6. The shaft 4 with the disk 5 is continuously rotated by any suitable device, such as a pulley 11 driven from another pulley 13. The sleeve 3 with the cap 7 may be oscillated by any suitable means, such as a connecting-rod 12 one end of which is connected to the pulley 13 while the other end is connected to an arm 16 attached to the sleeve 3. The disk 5 is suitably provided at its periphery, outside the cap 7, with teeth 14 or the like (Fig. 2), said teeth acting to beat the earth and thereby prevent the same from penetrating between the cap and the disk.

The seeding device described works as follows: The seed is fed into the discharge-tube and falls through the opening 9 upon the disk 5 the vanes 6 of which throw the seed against the inner side of the cap 7. On account of the oscillating movement of the cap 7 the openings 10 therein will reciprocate between the ends of the extended rear opening, and the seed is thus spread quite uniformly to the desired width independently of the positions of the spouts.

Though I have hereinbefore described my invention as particularly applicable for grain-drills I wish it to be understood that the invention may as well be employed for spreading other materials of any kind whatsoever, such as sand, water, manures, etc.

I claim:

1. In a grain-drill, the combination of a discharge-tube, a bottom at the lower end of the said tube, said tube having a rearwardly directed escape-opening just above the said bottom, and a rotary grain-spreading disk placed at the said lower end of the tube, just above the said bottom, substantially as and for the purpose set forth.

2. In a grain-drill, the combination of a discharge-tube having at its lower end a rearwardly directed escape-opening, a rotary grain-spreading disk placed at the said lower end of the tube, and a cap placed above the said spreading disk, said cap having an upper opening adapted to admit the grains onto the spreading disk and a rearward escape-opening for the said grains, substantially as and for the purpose set forth.

3. In a grain-drill, the combination of a discharge-tube having at its lower end a rearwardly directed escape-opening, a rotary grain-spreading disk placed at the said lower end of the tube, and an oscillating cap placed above the said spreading disk, said cap having an upper opening adapted to admit the grains onto the spreading disk and rearward escape-openings for the said grains, substantially as and for the purpose set forth.

4. In a grain-drill, the combination of a discharge-tube having at its lower end a rearwardly directed escape-opening, a rotary grain-spreading disk provided with a groove placed at the said lower end of the tube, and an oscillating cap placed above the said spreading disk and entering with its lower edge into the groove in the said spreading disk, said cap having an upper opening adapted to admit the grains onto the spreading disk and rearward escape-openings for the said grains, substantially as and for the purpose set forth.

5. In a grain-drill, the combination of a discharge-tube having at its lower end a rearwardly directed escape-opening, a rotary grain-spreading disk provided with a groove placed at the said lower end of the tube, said disk having teeth at its periphery, and an oscillating cap placed above the said spreading disk, co-axially therewith, and entering with its annular lower edge into the corresponding groove in the said spreading disk, said cap having an upper opening adapted to admit the grains onto the spreading disk and rearward escape-openings for the said grains, substantially as and for the purpose set forth.

ERIK GUSTAF RÅDBERG.

Witnesses:
   Aug. Sörensen,
   Kour. Dahlquist.